L. J., G. P., AND H. M. GREGERSON.
BOOK FOR INCOME TAX RETURNS.
APPLICATION FILED AUG. 28, 1920.
1,427,951.
Patented Sept. 5, 1922.
3 SHEETS—SHEET 1
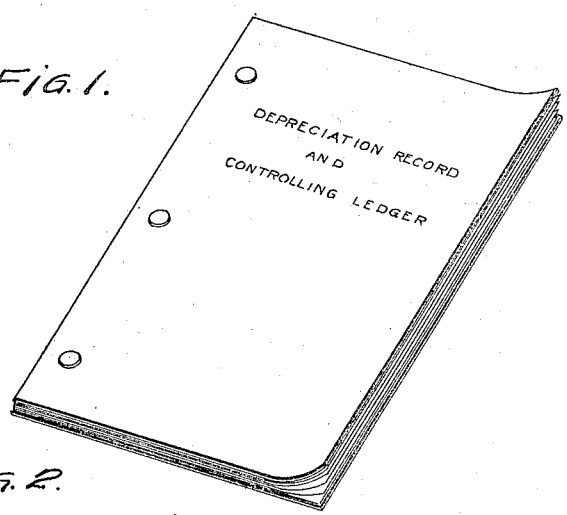

FIG. 6.

REMARKS ON DEPRECIATION RECORDS

| NAME OF ARTICLE | YEAR BOUGHT | COST | DEPRECN SUSTAINED | REMAINING VALUE | SALES PRICE | PROFIT | LOSS |
|---|---|---|---|---|---|---|---|
| | | | | | | | |

FIG. 7.

MEMORANDUM BANK BUILDING ACCOUNT

This is an exact copy of the Bank Building Account as same appears in the Current Ledger. The balance shown on this account added to the balance shown on the Bank Building Special Account next page (in Controlling Ledger only) gives the actual cost of the Property in use.

| DATE | | DEBIT | CREDIT | BALANCE |
|---|---|---|---|---|
| | | | | |

FIG. 8.

BANK BUILDING ACCOUNT— SPECIAL

This account gives amount of actual cost in excess of value shown on Current Ledger as per Memorandum Account preceeding this page.

| DATE | | DEBIT | CREDIT | BALANCE |
|---|---|---|---|---|
| | | | | |

FIG. 9.

MEMORANDUM FURNITURE AND FIXTURE ACCOUNT

This is an exact copy of the Furniture and Fixture Account as same appears in the Current Ledger. The balance shown on this account added to the balance shown on Furniture and Fixture Special Account next page (in Controlling Ledger only) gives actual cost of Furniture and Fixtures in use.

| DATE | | DEBIT | CREDIT | BALANCE |
|---|---|---|---|---|
| | | | | |

FIG. 10.

FURNITURE AND FIXTURE ACCOUNT— SPECIAL

This account gives amount of actual cost in excess of value shown on Current Ledger as per Memorandum Account preceeding this page.

| DATE | | DEBIT | CREDIT | BALANCE |
|---|---|---|---|---|
| | | | | |

FIG. 11.

CONTROLLING ACCOUNT FOR CURRENT LEDGER NET WORTH

| DATE | | DEBIT | CREDIT | BALANCE |
|---|---|---|---|---|
| | | | | |

Inventors
L. J. Gregerson, G. P. Gregerson, & H. M. Gregerson
By Semmer + Semmer
Attorneys Witness L. J., G. P., AND H. M. GREGERSON.
BOOK FOR INCOME TAX RETURNS.
APPLICATION FILED AUG. 28, 1920.

1,427,951.

Patented Sept. 5, 1922.

CAPITAL STOCK

| DATE | | DEBIT | CREDIT | BALANCE |
|------|--|-------|--------|---------|
|      |  |       |        |         |

FIG. 12

SURPLUS

| DATE | | DEBIT | CREDIT | BALANCE |
|------|--|-------|--------|---------|
|      |  |       |        |         |

FIG. 13

UNDIVIDED PROFITS

| DATE | | DEBIT | CREDIT | BALANCE |
|------|--|-------|--------|---------|
|      |  |       |        |         |

FIG. 14

DEPRECIATION RESERVE ACCOUNT

| DATE | | DEBIT | CREDIT | BALANCE |
|------|--|-------|--------|---------|
|      |  |       |        |         |

FIG. 15

BALANCE SHEET
AT CLOSE OF

| | | CURRENT LEDGER BALANCES | CONTROLLING LEDGER BALANCES | COMBINED NET BALANCES |
|--|--|------|------|------|
|  |  |      |      |      |

FIG. 16

ADJUSTMENT SHEET

| YEAR | | DR. | CR. | UNDIVIDED PROFITS ||
|------|--|-----|-----|---------|---------|
|      |  |     |     | DECREASED | INCREASED |

FIG. 17

Witness
*[signature]*

Inventors
L. J. Gregerson, G. P. Gregerson & H. M. Gregerson
By Semmes + Semmes
Attorneys Patented Sept. 5, 1922.

1,427,951

UNITED STATES PATENT OFFICE.

LOUIS J. GREGERSON, GREGERS P. GREGERSON, AND HENRY M. GREGERSON, OF OMAHA, NEBRASKA.

BOOK FOR INCOME-TAX RETURNS.

Application filed August 28, 1920. Serial No. 406,556.

*To all whom it may concern:*

Be it known that we, LOUIS J. GREGERSON, GREGERS P. GREGERSON, and HENRY M. GREGERSON, citizens of the United States, residing at Omaha, in the county of Douglas and State of Nebraska, have invented certain new and useful Improvements in Books for Income-Tax Returns, of which the following is a specification.

This invention relates to certain new and useful improvement in books for income tax returns and it more particularly relates to account books for the use of persons and various business enterprises upon which indicia of various kinds may be set forth and combined in such a manner as to give an accurate total of the various items from which the income tax return may be readily compiled.

The object of the invention is to enable individuals, banks, etc., to take advantage of all benefits to which they may be entitled under the Federal income tax law, especially with reference to the deduction for depreciation to which the taxpayers are entitled, and the actual capital invested based on actual costs and values.

The present National and State banking laws are not sufficiently flexible to allow banks to show actual values, depreciation, etc., on their current books, in fact, it may be stated that the bank examiners by reason of their conservatism, insist that banks carry building and equipment accounts generally below account values. Many banks indeed voluntarily write off entirely the amounts invested in building and equipment, and many commercial corporations and other taxpayers follow the same conservative methods.

The result of such methods is that the books of the taxpayers do not show actual values tied up in such assets, neither do they show actual amount of depreciation sustained. The internal revenue office will not allow deduction in tax returns for depreciation unless actually written off on the books, neither will that office allow actual values for "invested capital" as used in figuring the income tax unless it is proven up by documentary or other evidence.

Our records for depreciation and our sheets which constitute what we term the controlling ledger meets all of these requirements of the revenue office, giving taxpayers the full benefit to which they are entitled under the tax laws, without the necessity of making any change whatever in their present current books. No entries or changes in values as now carried on the books is necessary, for our controlling ledger which is based on standard double-entry accounting principles meets all requirements. It is supplemental to the present ledgers and operates as a controlling or private ledger so to speak which will at all times, give the real true values and net worth of the taxpayer.

For this purpose we provide a novel arrangement of records, the same consisting of certain sheets so divided by lines and columns with printed headings arranged at the top of each column in such manner that there will be spread before the parties using them such indicia as will enable said parties to put down with accuracy the actual decreased value, if such be the case, of the article or articles listed, so that full advantage may be taken of such depreciations and the deductions to which the taxpayer is entitled under the law providing for the imposition and collection of the income tax. The sheets constituting such record we term a depreciation record.

In the drawings,

Fig. 1 shows our book for income tax returns as it appears complete.

Figs. 2, 3, 4, 5, and 6 represent the sheets constituting our depreciation record.

Figs. 7, 8, 9, 10, 11, 12, 13, 14, and 15 represent the sheets constituting what we term our controlling ledger.

Fig. 16 represents our balance sheet.

Fig. 17 represents our adjustment sheet.

Referring now to the drawings, the numeral 1 shows the arrangement of the first sheet which is divided into columns with headings over each. In the first column is listed the article which is the subject of the tax, then follows the different headings showing when said article was bought; its term of life, the cost thereof, its salvage value, its depreciation per year, and in the last column of the sheet its depreciation down to 1909.

The numeral 2 refers to the second sheet, the first column of which shows the cost on January 1, 1909 and the five next columns its depreciation for the years 1909, 1910, 1911, 1912 and the first two months of the year 1913, when the income tax went into effect. The next two columns show its cost balance as of March 1913, and its market value on the same date.

The numeral 3 refers to Figure 4 of the drawings and the headings on that page show the name of the article its depreciation through the year 1914, 1915, 1916 and its net value after the 31st day of December of that year.

The numeral 4 refers to the 5th sheet of the drawings and the headings on that page show the name of the article the year bought, its term of life, its cost and its net value less depreciation on December 31.

There may be several of these sheets bringing it down to the date at which the tax return is made.

Additional sheets also may be added for the purpose of showing the depreciation record of the furniture and fixture such as chairs, desks, typewriters, tables, posting machines, etc.

The numeral 6 indicates the sheet for remarks on the depreciation record, in the first column is the name of the article and in the following columns the headings show the year it was bought, its cost, the depreciation sustained, the remaining value, sales price and its profit and loss. In other words a complete history of the article.

In this connection it may be stated that the actual cost figures should be used, or if not obtainable, use the best estimate that can be had for instance, if the building was purchased in its completed state there should be used the actual price paid. The life of buildings are according to their construction and material used. Bases for the rates are substantially as follows, for brick and stone, 50 years from date built, frame or stucco, 25 to 30 years from date built. These rates vary however according to local conditions. Small salvage value is generally used, representing amount which would be realized from the sale for old brick or lumber. Yearly amounts of depreciation is obtained by dividing the number of years of the life of the building into its cost less salvage value. On the lots there is usually no depreciation figure, in fact there is sometimes an increase upon the value of the ground.

Additions and improvements are added to the first cost of the building, and depreciation during the remaining years of its life, but ordinary repairs are deducted as expense each year.

The fair market value of the property on March 1, 1913, should be accurately and carefully established if possible by the affidavits of disinterested parties or proof of sale of similar property at that time.

The object of the sheet for remarks on depreciation record is for the purpose of giving needed details pertaining to articles which may have been sold.

It is not possible to give specific rates at which any certain class of assets should be depreciated, for the reason that conditions, climatic and otherwise, may vary greatly in different localities, and the wear on any certain article may also differ greatly with the different uses to which it may be subjected.

Each case should be judged entirely upon its own merit, and the taxpayer in the light of his past experience in his particular business, should be able to determine the proper rate to apply to each class of assets.

The number of years a frame building will be useful and serve the purpose for which it was constructed is usually figured at 25 to 35 years, although this estimate will depend on the degree of its substantial construction, and the use to which the building is put; a lightly constructed frame building, used for instance for factory purpose and in which heavy machinery is installed, may not have a useful life of more than 10 to 20 years.

Brick business buildings usually are good for 40 to 50 years from the date of construction, depending on the manner of construction, although the number of years of usefulness may be reduced to 30 or 40 years, if the same building is used for a factory and is subject to the destructive vibration of heavy pounding machinery.

Concrete and steel construction is considered serviceable up to 75 years.

Office furniture is usually considered serviceable for 10 to 15 years, while office equipment is of too great a variety to be classed under one rate, and due consideration should also be given to the degree of service to which each machine is subjected in a given length of time. A certain adding machine may remain in serviceable order in one line of business for eight or ten years, while the same machine in another line of business where subjected to harder use may reach the end of its usefulness in four to five years.

One typewriter may do satisfactory work in some offices for five to eight years, while in another office the same machine will have reached the scrapping or trading stage in from three to five years. The useful life of a posting machine is generally five to eight years and the rate applicable to other office machinery and equipment should be determined in the light of past experience with each class of equipment and due consideration given to probable scrap value, that is to say, the price that particular article might be sold for when the point is reached where it has ceased to give satisfactory service.

Factory machinery and equipment may of course, be depreciated at one flat rate for the entire factory, but this method is very unsatisfactory, and generally works out to the disadvantage of the taxpayer.

To arrive at the correct result, each machine should be judged individually and the rate determined on the basis of past experience with that particular machine in that particular line of business. Light or heavy use is of course an important factor in determining the rate of depreciation and consideration should also be given to the number of hours during which any particular machine is operated, viz, whether a single shift of 8 hours or double shift of 16 hours or more during a 24 hour period.

Automobiles and auto trucks subjected to ordinary use are generally considered serviceable for three to four years. If, however, the machine is operated over bad roads and subjected to hard usage, two years of service is perhaps all the machine may be capable of.

Figures 7 to 15 inclusive constitute what we term our controlling ledger or record, each sheet being divided into columns with headings, the first column having the heading Date, the second column being without a heading, the third column having the heading Debit, the fourth column having the heading Credit and the fifth column having the heading Balance. Each sheet is further provided at the top with a different title or will be observed by referring to the drawings.

Numeral 7 refers to the sheet with its appropriate heading showing "Memorandum building account."

Numeral 8 refers to the sheet with its appropriate heading for the "Bank building account-special."

The numeral 9 refers to the sheet for the "Furniture and fixture account memorandum."

The numeral 10 refers to the sheet carrying the "Furniture and fixture account-special."

The numeral 11 refers to the sheet entitled "Controlling account for current ledger, net worth."

The numeral 12 refers to the sheet for "Capital stock."

The numeral 13 refers to the sheet entitled "Surplus account."

The numeral 14 refers to the sheet for "Undivided profits."

The numeral 15 refers to the sheet for the "Depreciation reserve account."

As before stated in this connection sheets from 7 to 15 constitute the controlling ledger and it may be stated also that such ledger is supplementary to the current ledger and becomes in fact what may be called a private or controlling ledger and the sheet entitled the "Controlling account for current ledger, net worth," is the link by which the controlling ledger is connected with the current ledgers and carries as its name implies the control amount which balances the current ledgers and also represents the net worth consisting of capital, surplus and undivided profits.

This controlling ledger may be connected with the current ledgers either at the opening of business or at a later date, when the current ledgers are closed for instance, for the yearly period. This enables the taxpayer who on the ground of conservatism or for various other reasons may be carrying part of his assets on a current ledger at a figure below the actual cost of value, to reinstate such assets actual cost without the necessity of changing the present system of keeping records or books in order to use the actual cost of such assets for income tax purposes, thereby increasing proportionately the invested capital and depreciation deductions credit. It correctly meets all the requirements of the revenue office and yet permits the taxpayer to take advantage of all the benefits to which he is entitled under the income tax law.

The numeral 16 represents the sheet used for securing balances with appropriate headings of current ledger balances, controlling ledger balances and combined net balances. The numeral 17 shows the form of the adjustment sheet from which is made up the final figures upon which the income tax return is to be based.

Claims:

1. A book for income tax return comprising a series of sheets with appropriately designated lines, columns and headings for the entry of the articles to be listed, in such manner that the value of each article may be traced from one period of time to another and its proper measure of increase or depreciation noted, and a balance sheet indicative of the total actual measure of increase or depreciation of said articles respectively since the last tax return, upon which the income tax due may be based.

2. A book for income tax returns comprising a series of sheets with appropriately designated lines, columns and headings for the entry of the articles to be listed, other headings where the measure of increase or depreciation in value of said articles may be listed, other sheets with appropriate headings for records constituting the controlling ledger accounts, a sheet indicative of the total gross items of increase to be added to or of deduction to be allowed from the articles listed, and a sheet for the balance and adjustment of the total accounts from which sheets an estimate of the actual value of the several items may be obtained upon which the income tax returns may be based.

In testimony whereof we affix our signatures.

LOUIS J. GREGERSON.
GREGERS P. GREGERSON.
HENRY M. GREGERSON.